United States Patent
Zhang et al.

(10) Patent No.: US 11,479,369 B2
(45) Date of Patent: Oct. 25, 2022

(54) BAGGAGE CART

(71) Applicant: Nuctech Company Limited, Beijing (CN)

(72) Inventors: Li Zhang, Beijing (CN); Zhiqiang Chen, Beijing (CN); Qingping Huang, Beijing (CN); Wenyuan Bi, Beijing (CN); Xin Jin, Beijing (CN); Ming Chang, Beijing (CN); Mingzhi Hong, Beijing (CN); Yancai Wang, Beijing (CN)

(73) Assignee: Nuctech Company Limited, Beijing (CN)

( * ) Notice: Subject to any disclaimer, the term of this patent is extended or adjusted under 35 U.S.C. 154(b) by 154 days.

(21) Appl. No.: 16/336,750

(22) PCT Filed: Jan. 4, 2019

(86) PCT No.: PCT/CN2019/070451
§ 371 (c)(1),
(2) Date: Mar. 26, 2019

(87) PCT Pub. No.: WO2019/134679
PCT Pub. Date: Jul. 11, 2019

(65) Prior Publication Data
US 2021/0323696 A1    Oct. 21, 2021

(30) Foreign Application Priority Data
Jan. 5, 2018 (CN) .......................... 201810010255.4

(51) Int. Cl.
*B62B 3/00* (2006.01)
*G01N 23/04* (2018.01)
(Continued)

(52) U.S. Cl.
CPC .............. *B64F 1/368* (2013.01); *B62B 3/005* (2013.01); *B62B 5/0003* (2013.01); *G01N 23/04* (2013.01); *B62B 2202/24* (2013.01)

(58) Field of Classification Search
CPC ....... B64F 1/368; B62B 3/005; B62B 5/0003; B62B 2202/24; B62B 3/02; B62B 5/00;
(Continued)

(56) References Cited

U.S. PATENT DOCUMENTS 11,215,570 B2 *   1/2022   Zhang .................. G06Q 50/265
2013/0069759 A1   3/2013   Padgett et al.

FOREIGN PATENT DOCUMENTS

CN        202225891 U      5/2012
CN        202501914        10/2012
(Continued)

OTHER PUBLICATIONS

"Japanese Application Serial No. 2019-517782, Office Action dated Feb. 15, 2021", w/ English Translation, (Feb. 15, 2021), 7 pgs.
(Continued)

*Primary Examiner* — Courtney D Thomas
(74) *Attorney, Agent, or Firm* — Schwegman Lundberg & Woessner, P.A.

(57) ABSTRACT

A baggage cart is disclosed. The baggage cart is used for security inspection in an airport, comprising: a cart body, comprising at least one compartment having a door; and a locking device, coupled to the compartment and configured to lock the compartment in response to receiving an indication signal.

17 Claims, 10 Drawing Sheets

(51) Int. Cl.
  B64F 1/36 (2017.01)
  B62B 5/00 (2006.01)
(58) Field of Classification Search
  CPC ....... B62B 3/002; B62B 3/04; B62B 2203/50;
       B62B 2501/06; G01N 23/04; G01N
       23/046; G01V 5/0016; G01V 5/005;
       G01V 5/0008; A45C 5/14
  See application file for complete search history.

(56) References Cited

FOREIGN PATENT DOCUMENTS

| | | | |
|---|---|---|---|
| CN | 203651830 | | 6/2014 |
| CN | 104459812 | A | 3/2015 |
| CN | 105752122 | A * | 7/2016 |
| CN | 105752122 | A | 7/2016 |
| CN | 106741028 | A | 5/2017 |
| CN | 108001494 | A | 5/2018 |
| GB | 2355253 | | 4/2001 |
| JP | 08127282 | A | 5/1996 |
| JP | 09127021 | A | 5/1997 |
| JP | 2004069576 | A | 3/2004 |
| JP | 2013023363 | A | 2/2013 |
| JP | 2014132747 | A | 7/2014 |
| JP | 2017509891 | A | 4/2017 |
| KR | 200350844 | Y1 | 5/2004 |
| KR | 200455453 | Y1 | 9/2011 |
| KR | 20170128589 | A | 11/2017 |
| RU | 81467 | U1 | 3/2009 |
| WO | WO-2009007469 | A1 | 1/2009 |

OTHER PUBLICATIONS

"Japanese Application Serial No. 2019-517782, Office Action dated May 25, 2020", w/ English Translation, (May 25, 2020), 6 pgs.

"International Application No. PCT/CN2019/070451, International Search Report dated Mar. 29, 2019", w/ English Translation, (Mar. 29, 2019), 6 pgs.

"International Application No. PCT/CN2019/070451, Written Opinion dated Mar. 29, 2019", (Mar. 29, 2019), 5 pgs.

"European Application Serial No. 19711487.9, European Search Report dated Nov. 11, 2021", (Nov. 11, 2021), 5 pgs.

"Korean Application No. 2019-7009245, Office Action dated Jan. 29, 2020", (Jan. 29, 2020), 7 pgs.

"Russian Application Serial No. 2019109026/12(017292) dated Sep. 5, 2019", w/English Translation, 10 pgs.

* cited by examiner

BAGGAGE CART

This application is a U.S. National Stage Filing under 35 U.S.C. 371 from International Application No. PCT/CN2019/070451, filed on Jan. 4, 2019, and published as WO2019/134679 on Jul. 11, 2019, which claims the benefit of priority to Chinese Application No. 201810010255.4, filed on Jan. 5, 2018; the benefit of priority of each of which is hereby claimed herein, and which applications and publication are hereby incorporated herein by reference in their entirety.

TECHNICAL FIELD

Embodiments of the present disclosure relate to security technologies, and more particularly to a baggage cart that can be used for airport security inspection, as well as a security inspection system and method.

BACKGROUND

Currently, passengers at an airport mainly have activities comprising ticket purchasing, security inspection, check-in, baggage check-in, boarding, and other activities such as shopping, dining and the like at the airport. In order to solve the problem of storing the baggage, school bags, handbags and other items carried by passengers, the airport is generally equipped with carts for placing large and heavy baggage, so as to facilitate the activities of passengers in the airport. However, existing carts in the airport are always in an open state, causing the baggage or items on the existing carts easy to be taken out. Thus, the passengers need to take care of them, which may have a negative impact on the activities of the passenger in the airport, reducing the user experience.

SUMMARY

In view of above problems in the prior art, a baggage cart for security inspection in an airport, a security inspection system and a security inspection method have been proposed.

According to an aspect of the disclosure, there is provided a baggage cart for security inspection in an airport, comprising: a cart body, comprising at least one compartment having a door; and a locking device, coupled to the compartment and configured to lock the compartment in response to receiving an indication signal.

According to an embodiment of the present disclosure, the baggage cart may further comprise a scale disposed on at least one side of the compartment and configured to measure a size of a baggage.

According to an embodiment of the present disclosure, the baggage cart may further comprise a weighting device disposed under the cart body and configured to measure a weight of the baggage.

According to an embodiment of the present disclosure, the baggage cart may further comprise a display and/or a speaker configured to remind a user in response to the weight of the baggage exceeding a pre-defined value.

According to an embodiment of the present disclosure, the compartment is made of an explosion-proof material.

According to an embodiment of the present disclosure, the explosion-proof material is composed of at least one of polycarbonate material, fiberglass, carbon fiber composite material, and polyurethane.

According to an embodiment of the present disclosure, the baggage cart may further comprise an X-ray detection device: at least one X-ray source point, installed on a side of the compartment; a detector, configured to receive an X-ray; a controller, configured to control the X-ray source point to emit the X-ray in response to the door of the compartment being closed, and control the detector to receive the X-ray penetrating through the baggage and generate an electrical signal based on the received X-ray; a collecting device coupled to the detector and configured to convert the electrical signal into a digital signal; and a processor coupled to the collecting device and configured to process the digital signal, determine at least one physical attribute of the baggage based on the digital signal, and derive a first information on whether the baggage contains a hazardous material, based on the at least one physical attribute.

According to an embodiment of the present disclosure, the baggage cart may further comprise an X-ray detection device, comprising: at least one X-ray source point; a detector, configured to receive an X-ray; a controller, configured to control the X-ray source point to emit the X-ray in response to the door of the compartment being closed, and control the detector to receive the X-ray penetrating through the baggage and generate an electrical signal based on the received X-ray; a collecting device coupled to the collecting device and configured to convert the electrical signal into a digital signal; and a communication device configured to transmit the digital signal to a remote sever, and receive a second information on whether the baggage contains a hazardous material.

According to an embodiment of the present disclosure, the baggage cart may further comprise a detection device for cosmic rays comprising: a detector, configured to receive the cosmic rays penetrating through the baggage; a collecting device, coupled to the detector and configured to convert an electrical signal from the detector into a digital signal; and a processor, coupled to the collecting device and configured to process the digital signal, determine at least one physical attribute of the baggage based on the digital signal, and derive a third information on whether the baggage contains a hazardous material, based on the at least one physical attribute.

According to an embodiment of the present disclosure, the baggage cart may further comprise a detection device for cosmic rays comprising: a detector, configured to receive the cosmic rays penetrating through the baggage; a collecting device, coupled to the detector and configured to convert an electrical signal from the detector into a digital signal; and a communication device configured to transmit the digital signal to a remote sever, and receive a fourth information on whether the baggage contains a hazardous material.

According to an embodiment of the present disclosure, the baggage cart may further comprise a metal detector configured to detect that whether the baggage contains a metal and transmit a detection result to a processor, and the processer is configured to derive a fifth information on whether the baggage contains a metal.

According to an embodiment of the present disclosure, the baggage cart may further comprise a trace detector configured to generate a sixth information on whether the baggage contains a hazardous material by a trace detection.

According to an embodiment of the present disclosure, in response to at least one of the first information, the second information, the third information, the fourth information, the fifth information and the sixth information indicating an existence of the hazardous material, the controller is further configured to control the baggage cart to move to an alert zone.

According to an embodiment of the present disclosure, the cart body may comprise a first compartment and a second compartment, wherein the first compartment is configured to contain a checked-in baggage and the second compartment is configured to contain a carried-on baggage.

According to an embodiment of the present disclosure, the baggage cart may further comprise a hydraulic strut bar coupled to the cart body and configured to elevate the baggage under a control of the controller.

According to an embodiment of the present disclosure, the baggage cart may further comprise a push rod coupled to the cart body and configured to push the baggage off the compartment under the control of the controller.

According to an embodiment of the present disclosure, the baggage cart may further comprise a locating unit configured to generate a tracking signal when the user moves, so as to enable the baggage cart to track the movement of the user.

According to another aspect of the disclosure, there is provided a security inspection system, comprising: at least one baggage cart comprising at least one compartment for containing a baggage and configured to pass through a scanning channel; and a scanning device configured to inspect the baggage cart passing through the scanning channel and containing the baggage, at least based on a traveling speed of the baggage cart.

According to an embodiment of the present disclosure, the baggage cart comprises: a sensing sub-system configured to sense at least one physical attribute information of the baggage carried by the baggage cart; and a communication module configured to send the at least one physical attribute information to the scanning device, wherein the scanning device is further configured to adjust a scanning parameter for the baggage cart based on the at least one physical attribute information.

According to an embodiment of the present disclosure, the at least one physical attribute information may comprise at least one of a weight of the baggage; one of a density, an electron density, an equivalent atomic number and a material composition of a part of interest in the baggage; and a size and a location of the part of interest in the baggage; and wherein the scanning parameter comprises at least one of a radiation dose, a radiation energy, a scanning speed, a beam exit frequency, numbers of views, numbers of CT scanning angles, a distribution of CT scanning angles.

According to an embodiment of the present disclosure, the communication module may be further configured to transmit information on the traveling speed of the baggage cart to the scanning device, and the scanning device may be further configured to adjust the scanning parameter based on the traveling speed of the baggage cart.

According to an embodiment of the present disclosure, the traveling speed of the baggage cart is set depending on at least one of a weight and a size of the baggage.

According to an embodiment of the present disclosure, in response to detecting that the baggage has no danger by the scanning device, the baggage cart is configured to travel to a baggage counter and push a checked-in baggage in the compartment to a baggage carousel, or move the checked-in baggage onto the baggage carousel by an external mechanism.

According to an embodiment of the present disclosure, in response to detecting that the baggage has no danger by the scanning device, the baggage cart is further configured to travel to an exit of a passenger security check channel while carrying a carried-on baggage, and wait until the passenger security checking is completed.

According to an embodiment of the present disclosure, the baggage cart is further configured to travel to a boarding gate by following a passenger.

According to an embodiment of the present disclosure, in response to detecting that the baggage is suspicious by the scanning device, the baggage cart is further configured to travel to a manual inspection area, so as to enable performing a manual unpacking inspection on the baggage by an inspector.

According to an embodiment of the present disclosure, the baggage cart further comprises: a locking device coupled to a door of the compartment and configured to lock the door in response to detecting that the baggage is suspicious by the scanning device.

According to an embodiment of the present disclosure, the locking device is further configured to lock the door of the compartment in response to a security inspection starting signal.

According to an embodiment of the present disclosure, the baggage cart is further configured to receive an instruction to adjust an attitude of the baggage cart during a process of security inspection.

According to an embodiment of the present disclosure, the scanning device is further configured to inspect a plurality of baggage carts simultaneously, if the plurality of baggage carts pass through the scanning channel in parallel.

According to an embodiment of the present disclosure, the baggage cart comprises a first compartment and a second compartment, wherein the first compartment is configured to contain a checked-in baggage and the second compartment is configured to contain a carried-on baggage.

According to yet another aspect of the disclosure, there is provided a security inspection method, comprising steps of: receiving, by at least one baggage cart, identification information and flight information of a passenger, and loading the baggage of the passenger into at least one compartment of the baggage cart; passing through a scanning channel of a scanning device by the baggage cart, in response to a security inspection starting signal; inspecting the baggage cart that passes through the scanning channel and contains the baggage, at least based on a traveling speed of the baggage cart, so as to obtain a scanning result, and storing the scanning result in association with the identification information and flight information of the passenger.

According to an embodiment of the present disclosure, the security inspection method may further comprise the steps of: sensing, by the at least baggage cart, at least one physical attribute information of the baggage carried by the baggage cart and transmitting the at least one physical attribute information to the scanning device, and adjusting a scanning parameter for the baggage cart, based on the at least one physical attribute information.

According to an embodiment of the present disclosure, the at least one physical attribute information comprises at least one of a weight of the baggage; one of a density, an electron density, an equivalent atomic number and a material composition of a part of interest in the baggage; and a size and a location of the part of interest in the baggage; and wherein the scanning parameter comprises at least one of a radiation dose, a radiation energy, a scanning speed, a beam exit frequency, numbers of views, numbers of CT scanning angles, a distribution of CT scanning angles.

According to an embodiment of the present disclosure, the security inspection method may further comprise the steps of: transmitting information on the traveling speed of the baggage cart to the scanning device; and adjusting, by the scanning device, the scanning parameter based on the traveling speed of the baggage cart.

According to an embodiment of the present disclosure, the traveling speed of the baggage cart is set depending on at least one of a weight and a size of the baggage.

According to an embodiment of the present disclosure, the security inspection method may further comprises the step of: travelling, by the baggage cart, to a baggage counter and pushing a checked-in baggage in the compartment to a baggage carousel, or moving the checked-in baggage onto the baggage carousel by an external mechanism, in response to detecting that the baggage has no danger by the scanning device.

According to an embodiment of the present disclosure, the security inspection method may further comprises the step of: travelling, by the baggage cart, to an exit of a passenger security check channel while carrying a carried-on baggage, and waiting until the passenger security checking is completed, in response to detecting that the baggage has no danger by the scanning device.

According to an embodiment of the present disclosure, the security inspection method may further comprise the step of: travelling, by the baggage cart, to a boarding gate by following the passenger.

According to an embodiment of the present disclosure, the security inspection method may further comprise the step of: travelling, by the baggage cart, to a manual inspection area, so as to enable performing a manual unpacking inspection on the baggage by an inspector, in response to detecting that the baggage is suspicious by the scanning device.

According to an embodiment of the present disclosure, the security inspection method may further comprise the step of: locking a door of the compartment in response to detecting that the baggage is suspicious by the scanning device.

According to an embodiment of the present disclosure, the security inspection method may further comprise the step of: locking, by a locking device of the baggage cart, a door of the compartment in response to a security inspection starting signal.

According to an embodiment of the present disclosure, the security inspection method may further comprise the step of: adjusting, by the baggage cart, an attitude of the baggage cart during a process of security inspection, in response to a speed adjustment instruction.

According to an embodiment of the present disclosure, the security inspection method may further comprise the step of: inspecting, by the scanning device, a plurality of baggage carts simultaneously, if the plurality of baggage carts pass through the scanning channel in parallel.

By using the solutions of the embodiments, it is possible to improve experience of the passenger. In addition, it is also possible to accelerate the speed and the accuracy for security inspection, thereby reducing the security risk for the airport.

BRIEF DESCRIPTION OF THE DRAWINGS

In order to better understand the present disclosure, the present disclosure will be described in detail based on the following drawings.

DETAILED DESCRIPTION

The embodiments of the present disclosure are described in detail below, and it should be noted that the embodiments described herein are for illustrative purposes only and are not intended to limit the disclosure. In the following description, numerous specific details are set forth in order to provide a thorough understanding of the disclosure. However, it will be apparent to those skilled in the art that the disclosure can be practiced without those specific details. In other instances, well-known structures, materials, or methods are not specifically described in order to avoid obscuring the disclosure.

Throughout the description, referring to the term of "one embodiment", "an embodiment", "one example" or "an example" means that particular features, structures, or characteristics described in combination with such embodiment or such example may be combined in at least one embodiment of the disclosure. Thus, the expression of "in one embodiment", "in an embodiment", "in one example" or "in an example" does necessarily refer to the same embodiment or example. In addition, such particular features, structures, or characteristic can be combined in one or more embodiments or examples in any suitable combination and/or sub-combination. Moreover, it should be understood by those skilled in the art that the term "and/or" as used herein includes any and all combinations of one or more associated listed items.

In view of above problems in the prior art, embodiments of the present disclosure may provide a baggage cart for security inspection in an airport, a security inspection system and a security inspection method. According to an aspect of the disclosure, the baggage cart is used for security inspection in an airport. The cart body may comprise at least one compartment having a door. There may be a locking device coupled to the compartment and configured to lock the compartment in response to receiving an indication signal. In this way, passengers can place their baggage in a closed compartment, and the baggage cart is enabled to lock the door in response to detecting that the baggage may be dangerous or in response to receiving an external indication signal, thereby reducing the safety risk. For example, when the door of the compartment is locked, even the passenger himself cannot open the door. According to other embodiments, in response to detecting that the baggage may be dangerous by a detection sub-system on the baggage cart, the door is automatically locked and then the baggage cart may travel to an alert zone (such as an explosion-proof box or an explosion-proof house), so as to further reduce the security risk for the airport.

Figure 1:
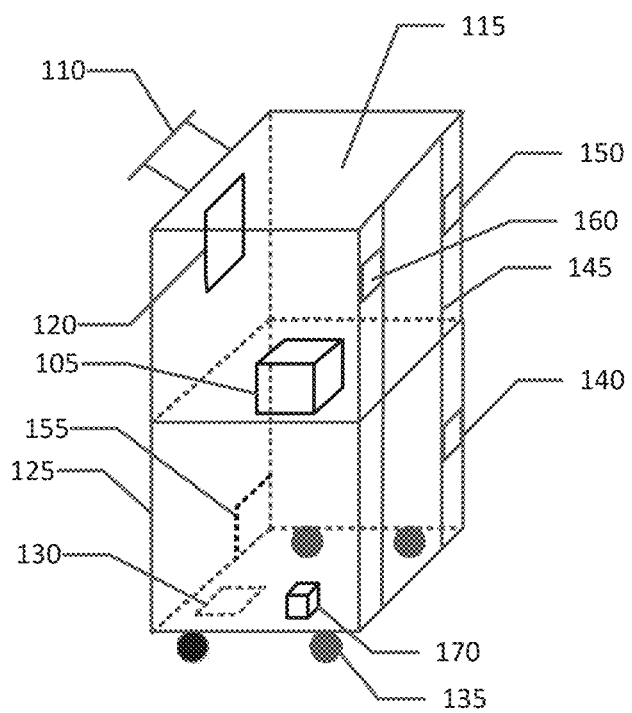
FIG. 1 shows a schematic structural view illustrating a baggage cart according to an embodiment of the present disclosure.

FIG. 1 shows a schematic structural view illustrating a baggage cart according to an embodiment of the present disclosure. As shown in FIG. 1, the cart body of the baggage cart 100 according to the embodiment may comprise a first compartment 115, a second compartment 125, and a handle 110 coupled to the first compartment.

According to an embodiment of the present disclosure, the first compartment is configured to contain for example a checked-in baggage 105 and the second compartment 125 is configured to contain for example a carried-on baggage 170. The handle 110 has a shape that is convenient for the passenger to grasp. Although the handle is shown in FIG. 1 as a crossbar, those skilled in the art will appreciate that the handle can be configured in other shapes, such as a semi-circular or a curved shape, without departing from the scope of the present disclosure. Although the first compartment 115 and the second compartment 125 are shown in FIG. 1 as being substantially cubic, those skilled in the art will appreciate that the compartments can be modified into other shapes, such as cuboids, cylinders, cones and the like, or a combination thereof, without departing from the scope of the present disclosure. It will be appreciated that in other embodiments, the baggage cart 100 of the present disclosure may be implemented without the handle, especially if the baggage cart has an automatic following capability.

The first compartment 115 and the second compartment 125 of the baggage cart according to the embodiment of the present disclosure are for example made of an explosion-proof material. The explosion-proof material is composed of at least one of polycarbonate material, fiberglass, carbon fiber composite material, and polyurethane.

The baggage cart 100 as shown in FIG. 1 may further include a weighting device 130, such as an electronic scale, disposed under the cart body and configured to measure a weight of the baggage, especially the checked-in baggage and the carried-on baggage. The weight data of the baggage is sent to a data processing device 155. The data processing device 155 compares the baggage with a preset standard. If the baggage is not overweight, the user is notified with an indication that the baggage is not overweight on the display screen 120 or is prompted that the baggage is not overweight in a voice broadcast.

If the data processing device 155 determines that the baggage is overweight, the user or passenger is prompted by the display screen 120 or the voice broadcast that the baggage is overweight. This makes it easier for the passenger to determine whether the baggage is overweight. In a case that the baggage is overweight, the data processing device 155 coupled to the weighing device 130 prompts the passenger that the baggage is overweight on the display screen 120 or through a speaker.

In the embodiment shown in FIG. 1, the first compartment 115 and the second compartment 125 of the baggage cart have a door 145. After the inputting his/her identification information and flight information through a user interface 165 and then taking a photo, the passenger will be authenticated by the processing device 155. If a positive acknowledge for the authentication is confirmed, the door 145 is opened, so as to facilitate the user to put the baggage into the first compartment 115 and the second compartment 125. According to an embodiment of the present disclosure, the locking device 140 or 150 of the baggage cart 100, such as an electronic lock, may also be configured to lock the door based on an external instruction or a detection result of an internal detection device (e.g., a trace detection device detects explosives or drugs). In a case that the door is locked by the locking device 140 or 150, even the passenger himself cannot open the door. In this case, the baggage cart informs an operator that there may be a hazardous material in the baggage, by the communication module. Alternative, the baggage cart may further travel into the alert zone (such as the explosion-proof box or the explosion-proof house) automatically, thereby reducing the security risk for the airport.

Figure 2:
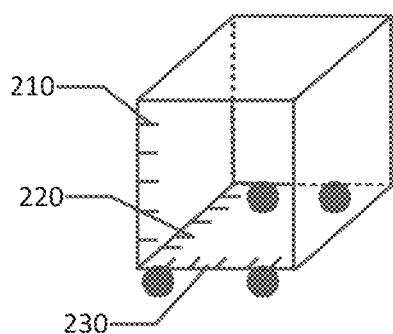
FIG. 2 shows a schematic structural view illustrating a baggage cart according to another embodiment of the present disclosure.

FIG. 2 shows a schematic structural view illustrating a baggage cart according to another embodiment of the present disclosure. As shown in FIG. 2, the baggage cart 200 according to the embodiment of the present disclosure is provided with scales 210, 220, 230 disposed outside or inside the compartment or the cart body, so as to facilitate the passenger to measure a size of the baggage. According to other embodiments, other measurement instruments, such as laser ranging device, may be used as an example of a scale. Those skilled in the art will appreciate that the type of the used scale does not affect the scope of the present disclosure.

It can be conceived by those skilled in the art that in a case of using a laser ranging device, measurement results can be sent to the data processing device 155 and then processed by the data processing device 155. After that, an indication on the size of the baggage or on whether the size of the baggage exceeds the preset standard may be displayed on the display screen 120. This makes it easier for passengers to check whether the size of the baggage exceeds the preset standard, thereby improving the passenger's experience.

Figure 3:
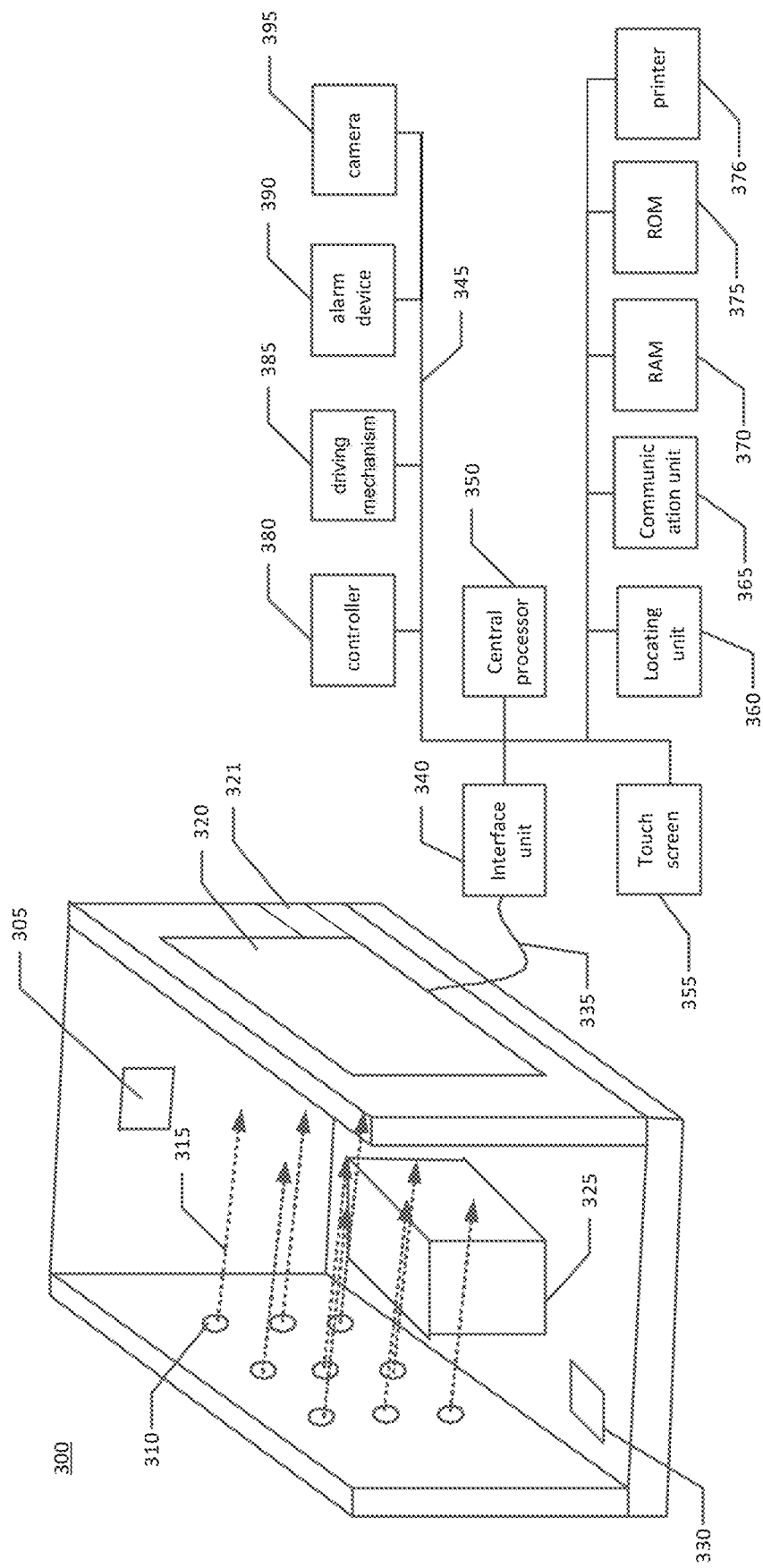
FIG. 3 shows a schematic structural view and a structural block diagram illustrating a baggage cart according to still another embodiment of the present disclosure.

FIG. 3 shows a schematic structural view and a structural block diagram illustrating a baggage cart according to still another embodiment of the present disclosure. The baggage cart 300 as shown in FIG. 3 includes a weighting device 330, such as an electronic scale, for weighing the baggage that the passenger puts into the baggage cart, especially the checked-in baggage and the carried-on baggage. The weight data of the bag is sent to a central processor 350. The central processor 350 compares the baggage with a preset standard. If the baggage is not overweight, the user is notified with an indication that the baggage is not overweight on the touch screen 355 or is prompted that the baggage is not overweight in a voice broadcast. The baggage cart 300 can also include a camera 395, which is configured to take photos of the baggage when the baggage is placed into the baggage cart. This may help in recording the baggage that is placed into the baggage cart.

The baggage cart shown in FIG. 3 may further comprise an X-ray detection device. For example, the X-ray detection device may comprise at least one X-ray source point 310, a detector 320, a data collecting device 321 and the like. As shown in FIG. 3, the at least one X-ray source point 310, such as a carbon nanotube X-ray tube, can be mounted on a first side of the compartment. The controller 380 may be configured to control the X-ray source point 310 to emit the X-ray in response to the door of the compartment being closed, and control the detector 320 to receive the X-ray penetrating through the baggage and generate an electrical signal based on the received X-ray. The collecting device 321 is coupled to the detector 320 and configured to convert the electrical signal into a digital signal. A processor 350 may be coupled to the collecting device 321 via an interface unit 340 and configured to process the digital signal, determine at least one physical attribute (such as a X-ray transparency value or a linear attenuation coefficient or an equivalent atomic number or an electron density and the like) of the baggage based on the digital signal, and derive a first information on whether the baggage contains a hazardous material, based on the at least one physical attribute. For example, if the at least one physical attribute such as the X-ray transparency value exceeds a threshold or falls into a certain range, the central processor 350 determines that the baggage contains the hazardous material. In this case, the central processor 350 may instruct an alarm device to alarm, instruct the locking device as shown in FIG. 1 to lock the door of the compartment, and instruct the driving mechanism 385 to automatically travel to the alert zone along a set route, by the controller 380. This may reduce the security risks for the airport.

It will be understood to those skilled in the art that the positions of the above-mentioned radiation source and detection device may not be limited to the case shown in FIG. 3. For example, the detector may be mounted on an L-shaped boom or a U-shaped boom or other shaped boom. The radiation source may be a single radiation source, or multiple radiation sources, or a distributed radiation source.

Although in the above embodiment, it is the processor of the baggage cart that determines whether the baggage is dangerous or not, those skilled in the art can also understand that such a determination can also be performed by transmitting the digital signal from the baggage cart to a remote server through the communication device, processing the digital signal by the remote server and sending a processed result back to the baggage cart from the remote server, wherein the processed result indicates whether the baggage being dangerous.

The baggage cart 300 of the embodiment of FIG. 3 may further include other detection devices 305, such as a trace detection device or a metal detector. In a case where the detection device 305 detects that there is a dangerous material such as explosives or drugs or heavy metals, the detection result is transmitted to the central processor 350 through the interface unit 340. The central processor 350 instructs the locking device as shown in FIG. 1 to lock the door of the compartment, and instruct the driving mecha- nism 385 to automatically travel to the alert zone (such as an explosion-proof box or an explosion-proof house) along a set route, by the controller 380. This may reduce the security risks for the airport.

In the embodiment shown in FIG. 3, the baggage cart 300 further includes a locating unit 360, a communication unit 365, a RAM (random access memory) 370 and a ROM (read only memory) 375, a printer 376, a storage driver, and the like. The locating unit 360 is configured to locate the baggage cart. For example, it can realize an automatic locating and navigation function of the baggage cart 300 by multiple technologies such as image, radar, wireless communication and the like. Thus, the baggage cart can automatically avoid obstacles during its operation, and may have a variety of movement patterns, such as tracking, piloting, independent operating and the like. For another example, the locating unit 360 is composed of at least one 3D camera and a signal processor. The distances between objects around the baggage cart are obtained by the camera to realize obstacle avoidance. The locating unit 360 collects scene data through the camera, and implements a spatial locating function by scene recognition based on the scene data. In addition, the locating unit 360 has a radar module (such as a laser radar, an ultrasonic radar, or an infrared radar), and may realize the obstacle avoidance function by detecting the substance and the distance of the obstacles around the baggage cart via the radar module. For another example, the locating unit 360 is composed of at least one infrared IR indicator emitting modulated infrared rays, which may be received by optical sensors installed at different positions in the airport, so as to realize the spatial location for the baggage cart. For another example, the locating unit 360 is composed of a Bluetooth module or a WiFi module or an RFID module, and a precise location can be realized by measuring a signal strength distribution and utilizing the triangulation method. In addition, the locating unit 360 may include a camera, so as to determine the position by scene recognition, such as, using a place guide information sign, a special mark posted on the floor/wall for a convenient car positioning, or a special texture of the roof/ceiling.

The communication unit 365 performs for example wireless communication with the outside, by employing communication technologies such as 3G and 4G/WLAN. It will be understood to those skilled in the art that the wireless communication herein is not limited to the above communication technology, which does not affect the scope of the present disclosure.

Moreover, those skilled in the art will appreciate that in addition to X-rays, other rays, such as gamma rays, may be utilized for security inspection for the baggage. Alternatively, cosmic rays such as tweezers (缪子) or electronics may be also utilized for security inspection for the baggage. In the case of cosmic rays, the radiation source may be not necessary since the cosmic rays naturally exist.

Figure 4:
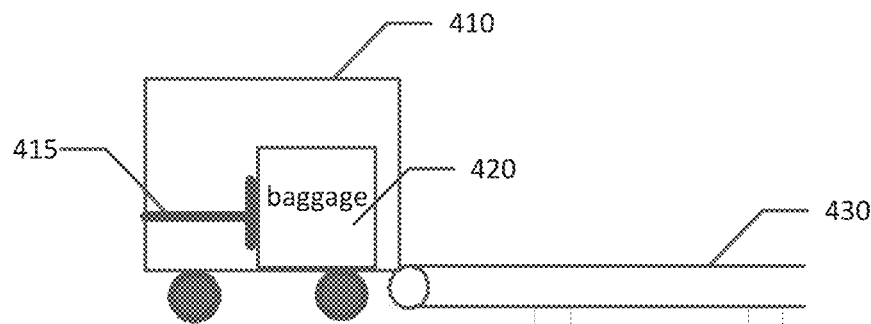
FIG. 4 shows a schematic diagram illustrating a process of pushing a baggage from a compartment onto a baggage carousel by the baggage cart in accordance with an embodiment of the present disclosure.
Figure 5:
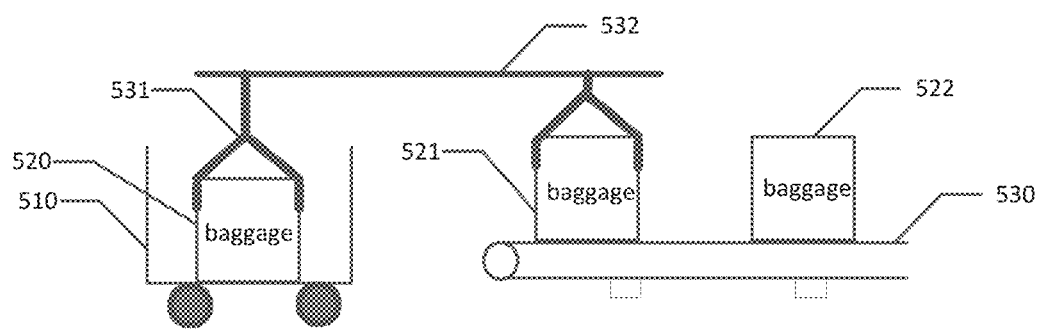
FIG. 5 shows a schematic diagram illustrating a process of transporting the baggage from the baggage cart to the baggage carousel in accordance with an embodiment of the present disclosure.

FIG. 4 shows a schematic diagram illustrating a process of pushing a baggage from a compartment onto a baggage carousel by the baggage cart in accordance with an embodiment of the present disclosure. As shown in FIG. 4, in the case where a detection result indicates the baggage having no danger, the baggage cart 410 automatically travels to the baggage check-in entrance, and then pushes the baggage 420 from the compartment to the baggage carousel 430 by a hydraulic strut bar 415, so as to check-in the baggage. FIG. 5 shows a schematic diagram illustrating a process of transporting the baggage from the baggage cart to the baggage carousel in accordance with an embodiment of the present disclosure. As shown in FIG. 5, there may be a robotic arm 521 configured to move on a crossbar 532, and take out the baggage 520 carried by the baggage cart 510 from the compartment of the baggage cart and place it on the baggage carousel 530. As shown in FIG. 5, the baggage 521 and 522 are placed on the baggage carousel for check-in.

Figure 6A:
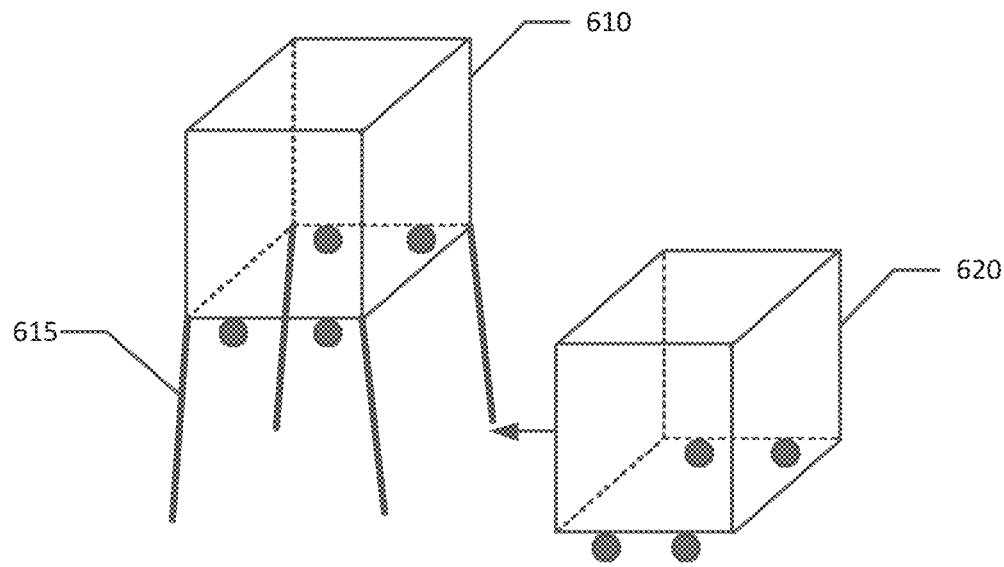
FIG. 6A shows a schematic diagram illustrating a process of combining two baggage carts in accordance with an embodiment of the present disclosure.
Figure 6B:
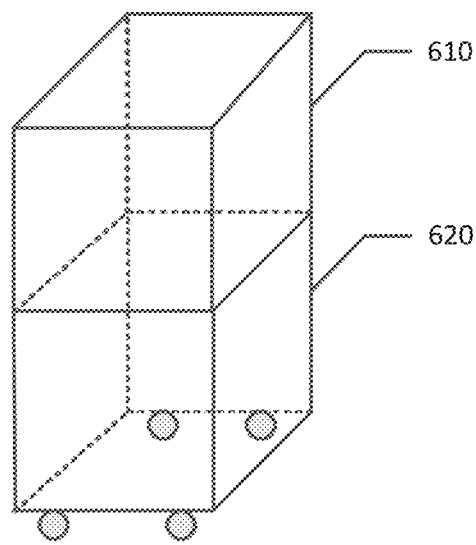
FIG. 6B shows a schematic diagram illustrating a combined baggage cart obtained by combining two baggage carts in accordance with an embodiment of the present disclosure.

The description discussed above is the case where the passenger uses one single baggage cart. In some cases, the passenger may use multiple baggage carts, especially if the passenger has lots of baggage. FIG. 6A shows a schematic diagram illustrating a process of combining two baggage carts in accordance with an embodiment of the present disclosure; and FIG. 6B shows a schematic diagram illustrating a combined baggage cart obtained by combining two baggage carts in accordance with an embodiment of the present disclosure.

As shown in FIG. 6A, when the passenger uses two baggage carts which each may have one single compartment, the two baggage carts can be superimposed. For example, four hydraulic strut bars on the sides of the baggage cart 610 can raise the body of the baggage cart 610, so as to form a space underneath the baggage cart 610. The other baggage cart 620 can automatically travel under the baggage cart 610, completing the superimposition process, as shown in FIG. 6B.

Figure 7:
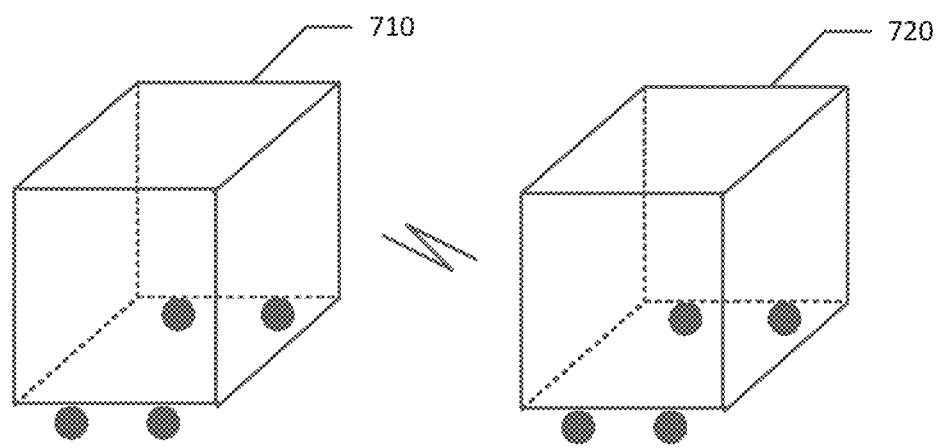
FIG. 7 shows a schematic diagram illustrating a process of forming a fleet with two baggage carts in accordance with an embodiment of the present disclosure.

FIG. 7 shows a schematic diagram illustrating a process of forming a fleet with two baggage carts in accordance with an embodiment of the present disclosure. As shown in FIG. 7, the two baggage carts can also form a fleet to serve the same passenger. For example, the baggage cart 710 and the baggage cart 720 communicate to remain within one meter with each other, and move as the passenger moves, achieving a function of tracking the passenger's movement.

Figure 8:
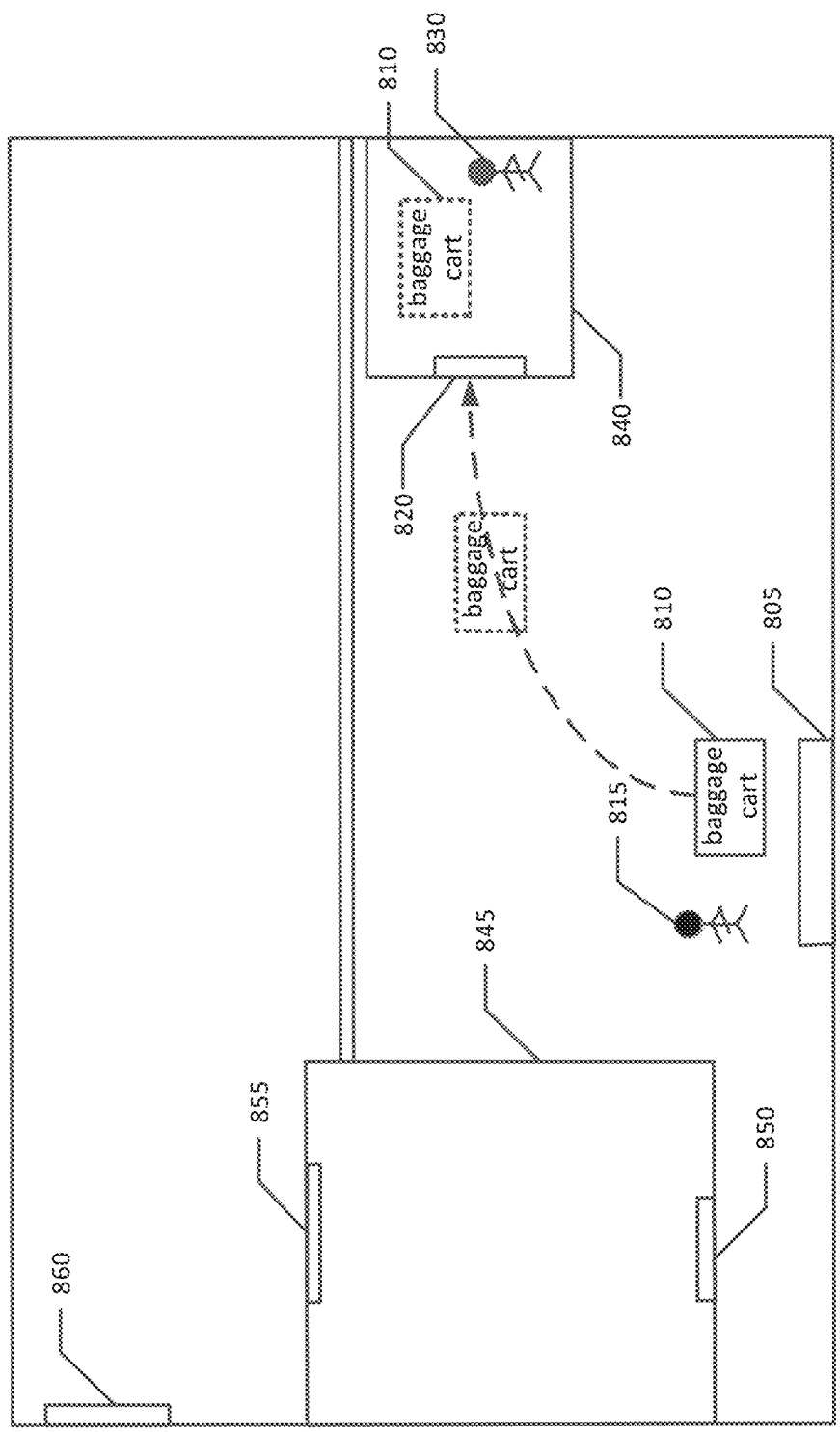
FIG. 8 shows a schematic diagram illustrating a process of traveling to an alert zone automatically by the baggage cart in accordance with an embodiment of the present disclosure.

FIG. 8 shows a schematic diagram illustrating a process of traveling to an alert zone automatically by the baggage cart in accordance with an embodiment of the present disclosure. As shown in FIG. 8, after arriving at the airport, the passenger 815 may get to an airport lobby through an entrance 805, obtain a baggage cart 810, and then proceed with identification authentication between the baggage cart 810 and himself/herself by for example inputting his/her the identification information and the flight information through a human-machine interface on the baggage cart, print boarding passes, completing the check-in process. Then, the passenger places his/her baggage in the baggage cart 810 and closes the door of the compartment. The passenger 815 will arrive at the entrance 850 of the passenger security check counter, perform a human body security inspection in the security inspection area 845, and leave the security inspection area through an exist 855. If the baggage has no danger, the passenger and the following baggage cart move toward the boarding gate 860.

On the other hand, the baggage is detected by the detection device such as the X-ray detection device and/or the trace detection device and/or the metal detector as described above. In the case where the detection device detects that there may be dangerous goods such as explosives or drugs or heavy metals in the baggage, the detection result is transmitted to the central processor 350 through the interface unit 340. The central processor 350 may instruct the locking device as shown in FIG. 1 to lock the door of the compartment, and instruct the driving mechanism 385 to automatically travel to the entrance 820 of the alert zone 840 along the set route, by the controller 380. The inspector 83 may perform a manual unpacking inspection or a special treatment on the baggage in the security inspection area 84, and notify the passenger. In this way, risk factors can be identified and disposed before the passenger enters the security inspection area, reducing the security risks for the airport.

Figure 9:
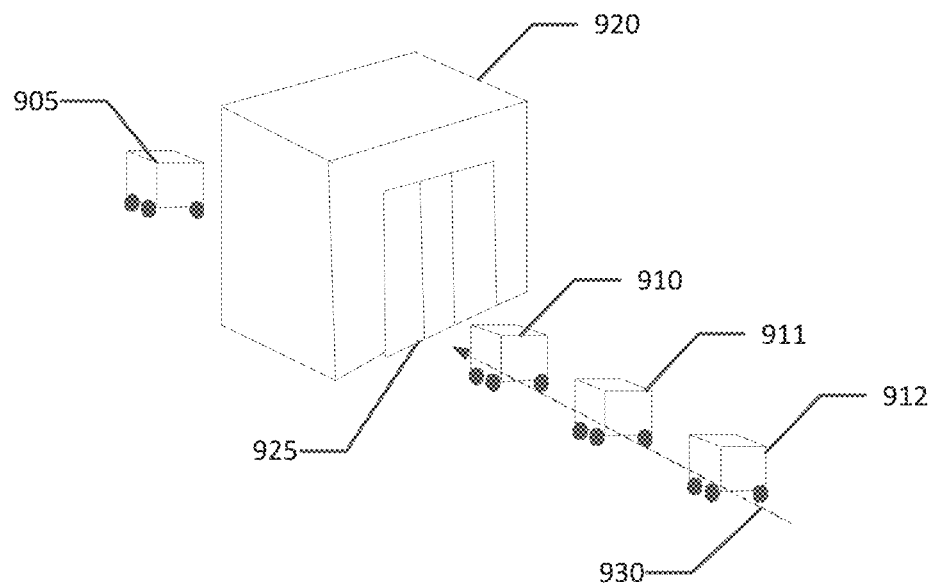
FIG. 9 shows a schematic diagram illustrating a process of performing a security inspection on the baggage cart carrying the baggage according to an embodiment of the present disclosure.

FIG. 9 shows a schematic diagram illustrating a process of performing a security inspection on the baggage cart carrying the baggage according to an embodiment of the present disclosure. As shown in FIG. 9, the baggage carts 910, 911, 912 automatically travel to the inspection channel for the baggage to await inspection by the scanning device 920. Upon receiving the command, the baggage carts 910, 911, and 912 sequentially enter the inspection channel to receive an X-ray transmission inspection or a CT examination. In some embodiments, in response to the security inspection starting signal, the locking device of the baggage cart locks the door of the compartment. The checked-in baggage cart 905 can automatically move to the baggage inspection entrance or wait for the passenger at the exit of the passenger security check channel. In the system shown in FIG. 9, guide marks 930 are provided on the ground, and the baggage cart sequentially enters the baggage inspection channel under the guidance of the guide marks. However, those skilled in the art will appreciate that in other embodiments that the guide marks are not provided, but the baggage cart automatically travels into the baggage inspection channel by precise locating. The scanning device 920 performs a security inspection on the baggage cart at least in consideration of its traveling speed. For example, the beam exit frequency of the scanning device 920 is set according to the travelling speed of the baggage cart. Additionally, in other embodiments, the scanning device 920 can perform an inspection on the baggage cart by considering other attributes, such as gestures. For example, if there is a certain direction that may achieve a better scanning effect, the baggage cart can be instructed to adjust its posture for the scanning.

Figure 10:
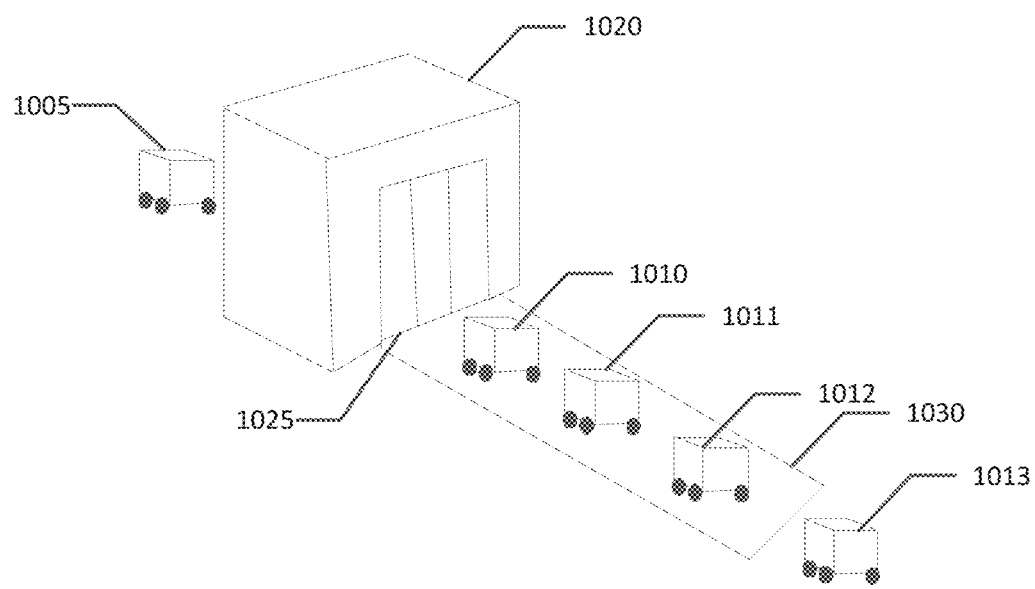
FIG. 10 shows a schematic diagram illustrating a process of performing a security inspection on the baggage cart carrying the baggage according to another embodiment of the present disclosure.

FIG. 10 shows a schematic diagram illustrating a process of performing a security inspection on the baggage cart carrying the baggage according to another embodiment of the present disclosure. As another example, the baggage carts 1010, 1011, 1012, 1013 can automatically travel onto the baggage carousel 1030 for security inspection by the scanning device 1020. The checked-in baggage cart 1005 can automatically move to the baggage inspection entrance or wait for passengers at the exit of the passenger security check channel.

Figure 11:
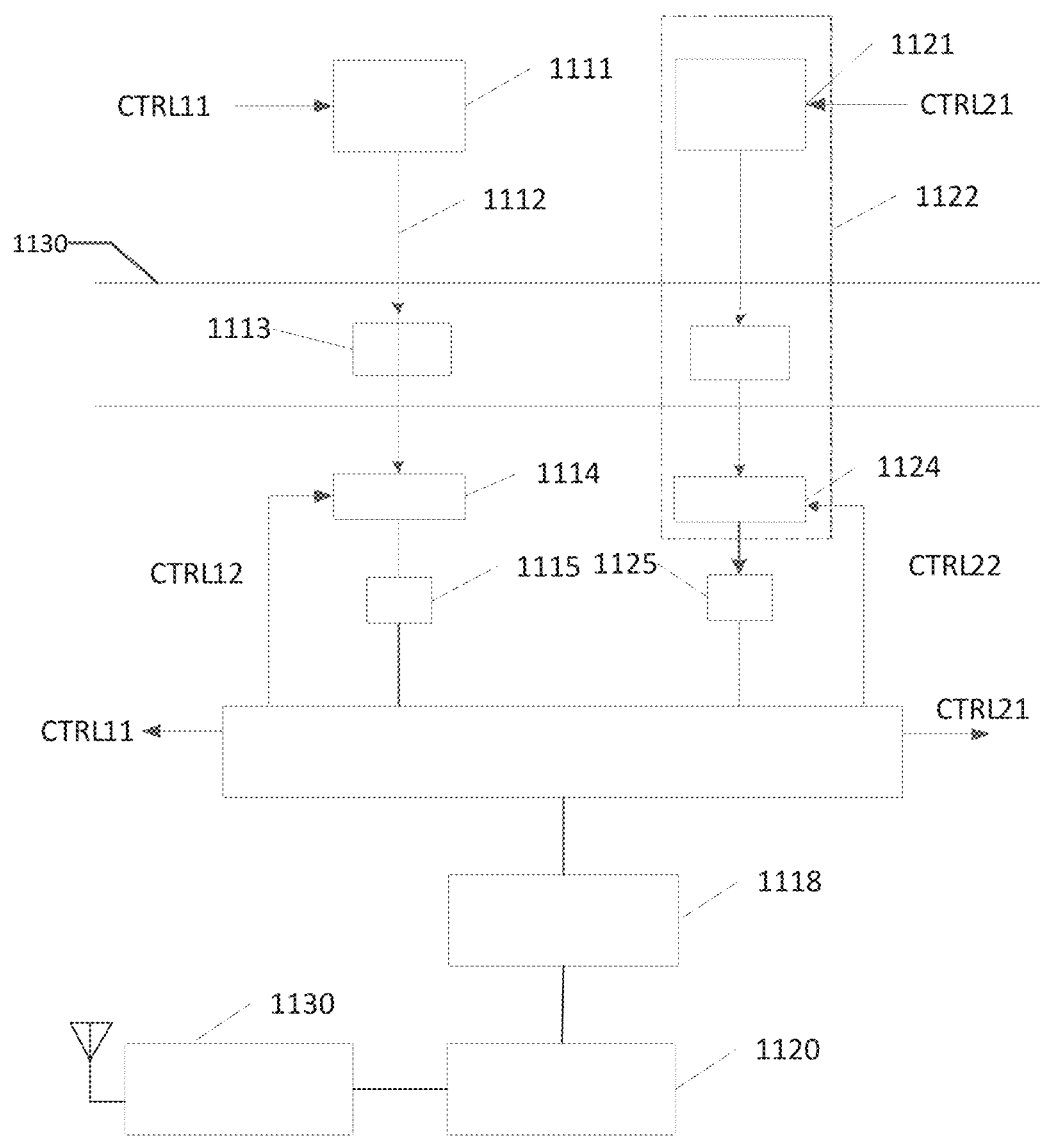
FIG. 11 shows a structural block diagram illustrating a security inspection system according to an embodiment of the present disclosure.

FIG. 11 shows a structural block diagram illustrating a security inspection system according to an embodiment of the present disclosure. The detection device shown in FIG. 11 includes a DR system on the left and a dual-energy CT system on the right, which share the scanning channel 1130. The baggage cart 1113 travels in the scanning channel 113.

The DR (Digital Radiography) emits the X-ray 1112 by using an X-ray source 1111. The X-ray penetrates the baggage cart 1113 in the scanning channel 1113. The detector module 1114 receives the transmission signal. The collecting circuit 1115 converts an analog signal into a digital signal and sends it to a controller 1117, a computer 1118 and so on. A transmission image of the object 1113 to be inspected is obtained in the computer 1118 and stored in a memory or displayed.

In some embodiments, the X-ray source 1111 can include a single X-ray source point, and can also include a plurality of X-ray generators, such as a distributed X-ray source including a plurality of X-ray source points.

As shown in FIG. 11, the baggage cart 1113 continues to travel in the scanning channel 1130, passes through the scanning area between the X-ray source 1111 and the detector 1114. In some embodiments, the detector 1114 and the collecting circuit 1115 are detecting and data collecting devices having an integral modular structure, such as multiple rows of detectors for detecting radiation transmitted through the object to be inspected, obtaining the analog signal, and converting the analog signal into the digital signal, so as to output projection data of the baggage cart 1113 for X-rays. The controller 1117 is used to control respective parts of the entire system to operate synchronously. The computer 1118 is used to process the data collected by the data collector, in particular, process and/or reconstruct the data, output the processed and/or reconstructed results, and store the results in association with passenger's information and flight information.

According to this embodiment, the detector 1114 and the collecting circuit 1115 are configured to acquire transmission data of the baggage cart 1113. The collecting circuit 1115 includes data amplification and shaping circuit that operates in an (current) integration mode or a pulse (count) mode. The collecting circuit 1115 is coupled to the controller 1117 and the computer 1118, to store the acquired data in the data processing computer 1118 in accordance with the trigger command.

In some embodiments, the detector module 1114 includes a plurality of detection units that receive X-rays that penetrate the object to be inspected. The data collecting circuit 1115 is coupled to the detector module 1114 to convert the signal generated by the detector module 1114 into a probe data. The controller 1117 is coupled to the radiation source 1111 via a controlling line CTRL11, is coupled to the detector module 1114 via a controlling line CTRL12, and is further coupled to the data collecting circuit 1115, and configured to control at least one of the X-ray generators in the X-ray source to generate X-rays, such that the X-rays can penetrate moving object to be inspected. Further, the controller 1117 controls the detector module 1114 and the data collecting circuit 1115 to obtain probe data. The computer 1118 reconstructs an image of the object to be inspected based on the probe data.

As the object to be inspected continues to travel forward, the dual energy CT system performs a CT scanning on the object to be inspected. The CT system emits X-rays 1122 by using the X-ray source 1121. The X-rays penetrate the baggage cart 1113 in the scanning channel 1130. As the baggage cart 1130 travels, the X-ray source 1121 and the detector 1124 rotate, thereby performing a CT scanning. The projection signal is detected by the detector module 1124. The collecting circuit 1125 may convert the analog signal into the digital signal, and transmit it to the controller 1117, the computer 1118, and the like. A tomographic image of the object 1113 to be inspected is obtained in the computer 1118, and then stored in the memory or displayed. For example, the scanning results are stored in association with passenger's information and flight information.

In some embodiments, the detector module 1124 includes a plurality of detection units that receive X-rays that penetrate the object to be inspected. The data collecting circuit 1125 is coupled to the detector module 1124 and configured to convert the signal generated by the detector module 1125 into probe data. The controller 1117 is coupled to the radiation source 1121 via the controlling line CTRL21, to the detector module 524 via the controlling line CTRL22, and to the data collecting circuit 1125. The controller 1117 is configured to control both of the high and low energy X-ray generators in the radiation source to generate X-rays with a high and a low energy alternatively, which penetrate the object to be inspected as the object moves. Thus, a dual-energy CT scanning can be achieved. Further, the controller 1117 controls the detector module 1124 and the data collecting circuit 1125 to obtain projection data. The computer 1118 reconstructs the image of the object to be inspected based on the projection data, and performs substance recognition as a scanning result. For example, the scanning results are stored in association with passenger's information and flight information.

For another example, in the embodiment shown in FIG. 11, the baggage cart 1113 passes through the DR system and the dual-energy CT system, and the obtained two-dimensional and dual-energy three-dimensional image data is sent to the computer for substance recognition. The substance recognition system installed in the computer identifies the baggage carried by the baggage cart according to the image data, so as to obtain information such as the equivalent atomic number and the density of different substances, and colors the two-dimensional image and the three-dimensional image so as to determine the presence of the hazardous material or mark the hazardous material automatically.

In the above process, the server 1120 receives a message from the baggage cart 1113 via the communication device 1130, and the computer 1118 sends an instruction to the baggage cart through the server 1120 and the communication device 1130, for example, for adjusting the traveling speed or posture of the baggage cart 1113.

Although the above description describes performing the DR scanning and dual-energy X-ray scanning simultaneously, those skilled in the art will appreciate that in other embodiments, the scanning device may apply single-energy scanning technology or other scanning techniques such as a dual energy CT, a large pitch CT, a sparse angle CT, a detector under-sampling CT, an internal reconstruction CT, a linear trajectory CT, and the like, to perform the scanning of the baggage, without affecting the scope of the present disclosure.

In the illustrated embodiment, for example, an onboard X-ray detector may obtain preliminary information about the baggage. For example, a sensing sub-system on the baggage cart may sense at least one physical attribute information of the baggage carried by the baggage cart, for example, a weight of the baggage; one of a density, an electron density, an equivalent atomic number and a material composition of a part of interest in the baggage; a size and a location of the part of interest in the baggage; and the like. The communication unit of the baggage cart transmits the at least one physical attribute information to the scanning device. The scanning device adjusts the parameters for scanning the baggage cart based on the at least one physical attribute information, For example, the scanning device adjusts a radiation dose, a radiation energy, a scanning speed, a beam exit frequency, numbers of views, numbers of CT scanning angles, a distribution of CT scanning angles, and the like.

For example, the communication unit of the baggage cart transmits the information on the traveling speed of the baggage cart to the scanning device. The scanning device adjusts the scanning parameters based on the traveling speed of the baggage cart. Here, the traveling speed of the baggage cart is set based on for example at least one of the weight and the size of the baggage. Specifically, the baggage with a large weight and a large size has a smaller traveling speed, while the baggage with a light weight and a smaller size has a greater traveling speed. As another example, if the region of interest in the baggage is already known, the CT dual energy scanning can be performed only for that region. This improves a clearance speed of baggage security inspection.

For example, in response to a speed adjustment instruction, at least one of the baggage carts adjusts the posture of the baggage cart during the inspection. Specifically, if the details for the baggage cannot be seen under the transmission scanning from a certain viewpoint, the operator sends a 90-degree rotation instruction to the baggage cart through the communication device 1130. Then the baggage cart moves forward after rotating 90-degree and retreating a distance. Such a scanning process can obtain a transmission image or a CT image under another posture. This inspection process also improves the accuracy of the inspection.

Figure 12:
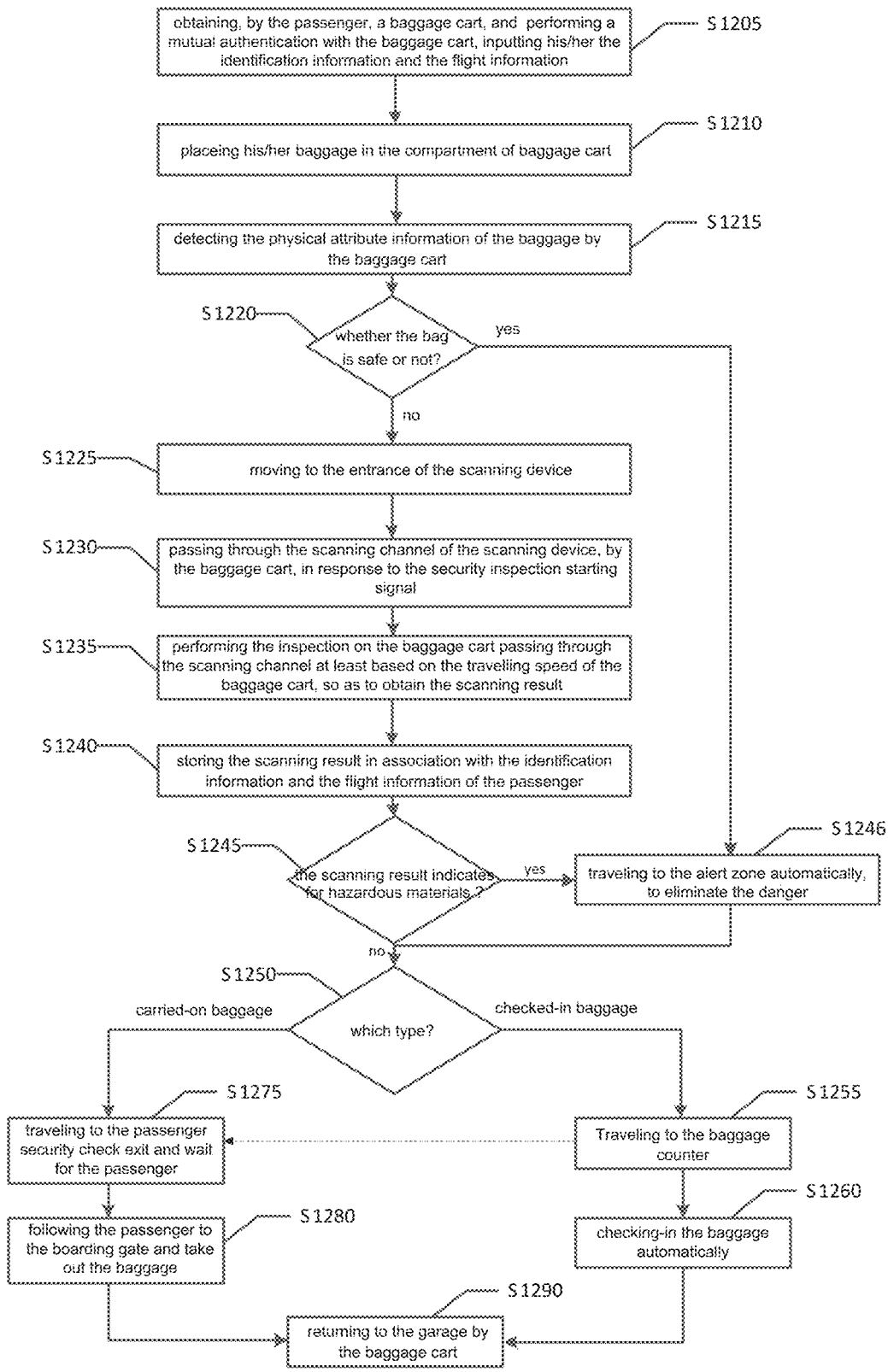
FIG. 12 shows a schematic flowchart depicting a security inspection method according to an embodiment of the present disclosure.
Figure 13:
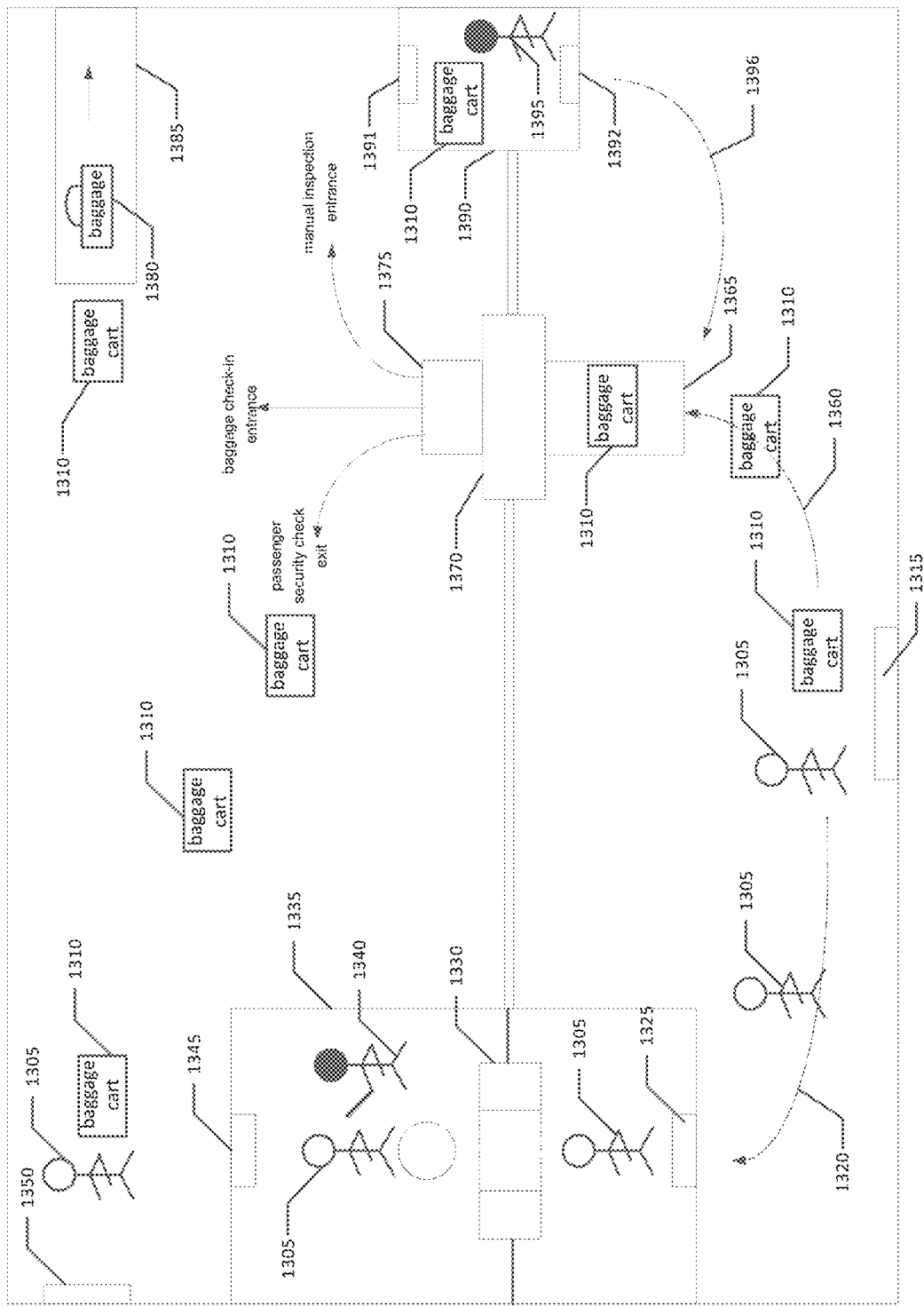
FIG. 13 shows a diagram of an example in which a security inspection system is applied to an airport according to an embodiment of the present disclosure.

FIG. 12 shows a schematic flowchart depicting a security inspection method according to an embodiment of the present disclosure. FIG. 13 shows a diagram of an example in which a security inspection system is applied to an airport according to an embodiment of the present disclosure.

As shown in FIG. 12, after the passenger 1305 arrives at the airport, at step S1205, the passenger 1305 may get to an airport lobby through an entrance 1315, obtain a baggage cart 1310, and then proceed with identification authentication between the baggage cart 1310 and himself/herself by for example inputting his/her the identification information and the flight information through a human-machine interface on the baggage cart, print boarding passes, completing the check-in process. At step S1210, the passenger places his/her baggage in the baggage cart 1310 and closes the door of the compartment.

At step S1215, the baggage is detected by the detection device such as the X-ray detection device and/or the trace detection device and/or the metal detector as described above, so as to obtain preliminary information about the baggage. For example, a sensing sub-system on the baggage cart may sense at least one physical attribute information of the baggage carried by the baggage cart, for example, a weight of the baggage; one of a density, an electron density, an equivalent atomic number and a material composition of a part of interest in the baggage; a size and a location of the part of interest in the baggage; and the like. The communication unit of the baggage cart transmits the at least one physical attribute information to the scanning device.

At step S1220, a preliminary determination is made as to whether the bag is safe. If no hazardous material is detected at step S1220, at step S1225, the passenger 1305 moves to the entrance 1325 of the human body security check channel 1335, and the baggage cart 1310 automatically moves to the baggage security inspection entrance 1365. For example, the baggage cart 1310 can travel to the baggage security inspection entrance 1365 automatically by utilizing its own locating/navigation system or travel along a particular marking line on the ground to the baggage security inspection entrance 1365.

In step S1230, in response to the security inspection starting signal, the baggage cart 1310 locks the door of the compartment, so as to be inspected by the scanning device 1370. At step S1235, the scanning device 1370 performs a security inspection in view of at least the traveling speed of the baggage cart. For example, the beam exit frequency of the scanning device 1370 is set according to the traveling speed of the baggage cart. Additionally, in other embodiments, the scanning device 1370 can scan the baggage cart in view of other attributes, such as postures. For example, if there is a certain direction that may achieve a better scanning effect, the baggage cart can be instructed to adjust its posture for the scanning. For example, the scanning device adjusts the parameters for scanning the baggage cart based on the at least one physical attribute information. For example, the scanning device adjusts a radiation dose, a radiation energy, a scanning speed, a beam exit frequency, numbers of views, numbers of CT scanning angles, a distribution of CT scanning angles, and the like.

For example, the communication unit of the baggage cart transmits the information on the traveling speed of the baggage cart to the scanning device, and the scanning device adjusts the scanning parameters based on the traveling speed of the baggage cart. Here, the traveling speed of the baggage cart is set based on for example at least one of the weight and the size of the baggage. Specifically, the baggage with a large weight and a large size has a smaller traveling speed, while the baggage with a light weight and a smaller size has a greater traveling speed. As another example, if the region of interest in the baggage is already known, the CT dual energy scanning can be performed only for that region. This improves a clearance speed of baggage security inspection.

For example, in response to a speed adjustment instruction, at least one of the baggage carts adjusts the posture of the baggage cart during the inspection. Specifically, if the details for the baggage cannot be seen under the transmission scanning from a certain viewpoint, the operator sends a 90-degree rotation instruction to the baggage cart through the communication device. Then the baggage cart moves forward after rotating 90-degree and retreating a distance. Such a scanning process can obtain a transmission image or a CT image under another posture. This inspection process also improves the accuracy of the inspection.

After obtaining the scanning result, at step S1240, the scanning device 1370 stores the scanning result in association with the passenger's information and the flight information. For example, the passenger's information and the flight information may be stored in a local storage device for a reviewer to review, or stored in a cloud for the reviewer to review.

If it is detected that there may be a suspicious item or a hazardous material by the sensing sub-system of the baggage cart 1310 at step S1220, the baggage cart 1310 automatically travels from the exit 1375 of the baggage inspection channel to the entrance 1391 of the alert zone 1390 at step S1246, so as to eliminate the danger. For example, in the alert zone 1390, the baggage cart 1310 is unpacked by the security inspector 1395. After the manual unpacking inspection, if the re-inspection is required, the baggage cart leaves from the exit 1392 of the alert zone and moves toward the baggage inspection channel 1365 to perform a secondary security inspection.

At step S1245, the inspector determines whether the baggage is dangerous or not. If it is dangerous, the flow proceeds to step S1246, which is not described herein again. If it is determined in step S1245 that there is no danger, at step S1250, it is determined that whether the type of the baggage is checked-in baggage or carried-on baggage. For example, if there is no baggage in the carried-on baggage compartment, it is determined that there is no carried-on baggage, but only the checked-in baggage. If there is checked-in baggage and carried-on baggage, the check-in process will be firstly performed, and then the baggage cart will automatically drive to the exit of the passenger security check channel. For example, the passenger 1305 travels to the entrance 1325 of the human body security check channel, enters a security gate 1330, and then be performed with a manual check by the security inspector 1340 holding a security inspection device. After the inspection is acknowledged with a positive result, the passenger 1305 exits the security check area and waits for the baggage cart at the exit 1345.

If it is determined that there is checked-in baggage on the baggage cart at step S1250, at step S1255, the baggage cart 1310 can automatically transport the baggage to the baggage counter, and at step S1260, push a checked-in baggage in the compartment to a baggage carousel, so as to be checked-in. At step S1290, after completing the check-in process, the baggage cart automatically travels to a garage for storage.

If it is determined that there is only carried-on baggage on the baggage cart at step S1250, at step S1275, the baggage cart 1310 travels to the exit 1345 of the human body security check channel, and waits for the presence of the passenger. It is the exit 1345 of the human body security check channel where the passenger 1305 and the baggage cart 1310 will meet. At step S1280, the baggage cart 1310 follows the passenger to move to the boarding gate 1350. Before boarding, the passenger enters the password or PIN to open the compartment of the baggage cart, and removes the baggage. Then, at step S1290, the baggage cart automatically travels to the garage for storage.

In another embodiment, if the baggage in one compartment of the baggage cart is the checked-in baggage and the baggage in another compartment of the baggage cart is the carried-on baggage, after completing the baggage check-in, the process proceeds from step S1260 to step S1275, in which the baggage cart travels to the exit 1345 of the passenger security check channel while carrying the carried-on baggage, and waits for the appearance of passengers. The subsequent process will not be repeated here.

Figure 14:
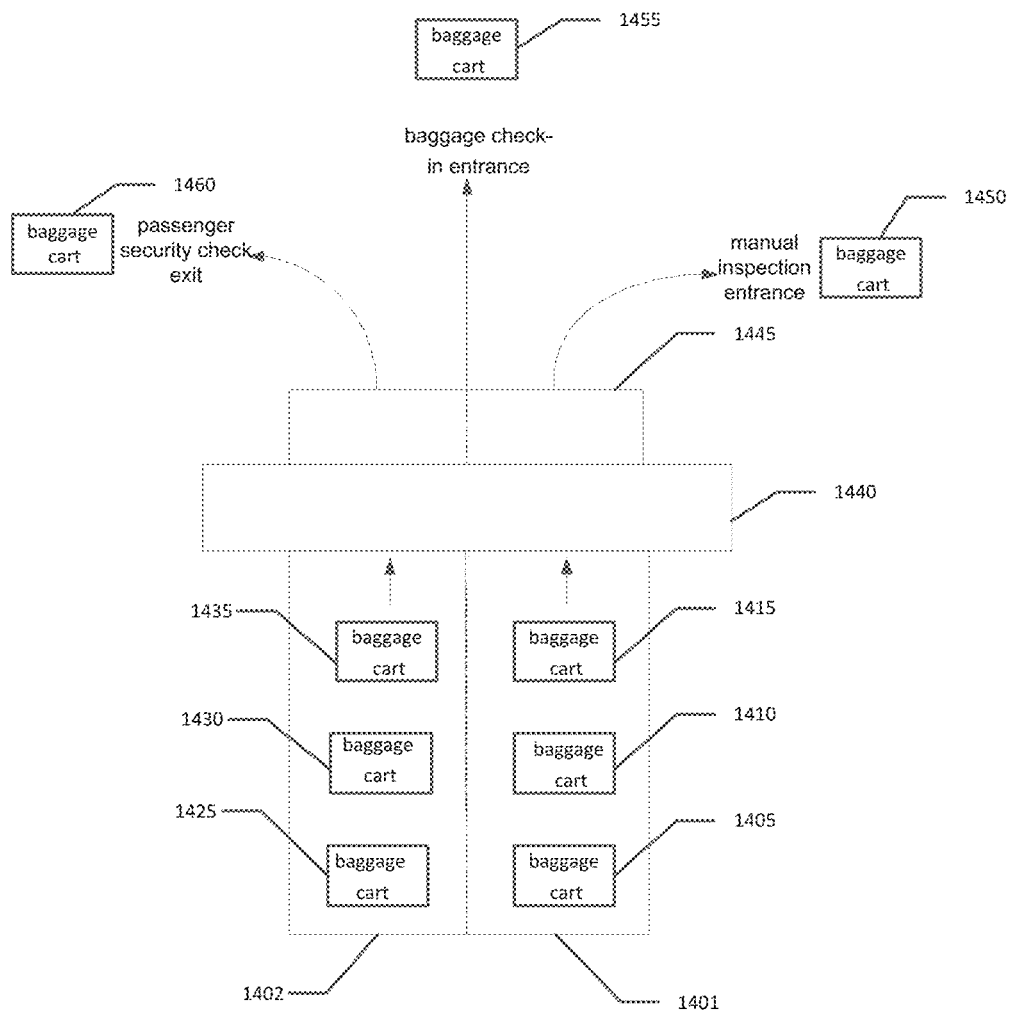
FIG. 14 shows a diagram of an example in which a security inspection system is applied to an airport according to another embodiment of the present disclosure.

The above description is only an embodiment for single-channel inspection, those skilled in the art will appreciate that security inspection for multiple baggage carts can be performed at the same time, thereby improving security inspection efficiency. FIG. 14 shows a diagram of an example in which a security inspection system is applied to an airport according to another embodiment of the present disclosure. As shown in FIG. 14, the scanning channel of scanning device 1440 has two entrances 1401 and 1402 in parallel. Baggage carts 1425, 1430, and 1435 enter the scanning channel through security inspection entrance 1402, while baggage carts 1405, 1410, and 1415 enter the scanning channel through security inspection entrance 1401. If the baggage needs to be re-examined, the baggage cart 1405 travels from the security exit 1445 to the entrance to the alert zone. If the baggage is checked-in baggage, the baggage cart 1455 travels to the baggage check-in entrance. If the baggage is the carried-on baggage, the baggage cart 1460 travels to the entrance of the human-body security check channel to wait until the passenger security check is completed. Before boarding, the passenger enters the password or PIN to open the compartment of the baggage cart, and removes the baggage. Then, the baggage cart automatically travels to the garage for storage.

The above detailed description has set forth numerous embodiments of the baggage cart, the security inspection system and the operating method by using schematics, flowcharts, and/or examples. In the event that such schematics, flowcharts, and/or examples include one or more functions and/or operations, those skilled in the art will appreciate that each function and/or operation in such a schematic, flowchart, or example can be implemented individually and/or collectively by various structures, hardware, software, firmware or virtually any combination thereof. In one embodiment, portions of the subject matter of embodiments of the present invention may be implemented in an application specific integrated circuit (ASIC), a field programmable gate array (FPGA), a digital signal processor (DSP), or other integrated format. However, those skilled in the art will appreciate that some aspects of the embodiments disclosed herein may be implemented in an integrated circuit as a whole or in part, or implemented as one or more computer programs running on one or more computers (e.g., implemented as one or more programs running on one or more computer systems), or implemented as one or more programs running on one or more processors (e.g., implemented as one or more programs running on one or more microprocessors), or implemented as firmware, or substantially in any combination of the above. Furthermore, those skilled in the art may have the capabilities for designing a circuitry and/or writing software and/or firmware code in view of the present disclosure. Moreover, those skilled in the art will recognize that the mechanisms of the subject matter described herein can be distributed as a variety of forms of program products. It is suitable for applying to the subject matter of the present disclosure, regardless of the particular type of signal bearing medium that is actually used to perform the distribution. Examples of signal bearing medium may include, but are not limited to, a recordable medium such as floppy disks, hard drives, compact disks (CDs), digital versatile disks (DVDs), digital tapes, computer memories, and the like; and a transmission medium such as a digital and/or analog communication medium (e.g., fiber optic cable, waveguide, wired communication link, wireless communication link, etc.).

While the disclosure has been described with respect to several typical exemplary embodiments, it should be understood that the terms used herein are for illustrative purposes only and are not intended to limit the disclosure. Since the disclosure may be implemented in a variety of forms without departing from the spirit or scope of the disclosure, it should be also understood that the embodiments are not limited to the details discussed above, and it should be interpreted broadly within the scope and sprit of the disclosure defined by the appended claims. Thus, all changes and modifications that fall within the scope of the claims or the equivalents thereof are intended to be covered by the appended claims.

We claim:

1. A baggage cart for security inspection in an airport, comprising:
    a cart body, comprising at least one compartment having a door;
    a locking device, coupled to the compartment and configured to lock the compartment in response to receiving an indication signal; and
    an X-ray detection device, wherein the X-ray detection device comprises:
        at least one X-ray source point;
        a detector, configured to receive an X-ray; a controller, configured to control the X-ray source point to emit the X-ray in response to the door of the compartment being closed, and control the detector to receive the X-ray penetrating through the baggage and generate an electrical signal based on the received X-ray; and
        a collecting device, coupled to the detector and configured to convert the electrical signal into a digital signal.

2. The baggage cart of claim 1, further comprising:
    a scale, disposed on at least one side of the compartment and configured to measure a size of a baggage.

3. The baggage cart of claim 1, further comprising:
    a weighting device, disposed under the cart body and configured to measure a weight of a baggage.

4. The baggage cart of claim 3, further comprising: a display and/or a speaker, configured to reminder a user in response to the weight of the baggage exceeding a predefined value.

5. The baggage cart of claim 1, the compartment is made of an explosion-proof material.

6. The baggage cart of claim 5, the explosion-proof material is composed of at least one of polycarbonate material, fiberglass, carbon fiber composite material, and polyurethane.

7. The baggage cart of claim 1, wherein the X-ray detection device further comprises:
   a processor coupled to the collecting device and configured to process the digital signal, determine at least one physical attribute of the baggage based on the digital signal, and derive a first information on whether the baggage contains a hazardous material, based on the at least one physical attribute.

8. The baggage cart of claim 1, wherein the X-ray detection device further comprises:
   a communication device, configured to transmit the digital signal to a remote sever, and receive a second information on whether the baggage contains a hazardous material.

9. The baggage cart of claim 1, further comprising a detection device for cosmic rays, comprising:
   a detector, configured to receive the cosmic rays penetrating through the baggage;
   a collecting device, coupled to the detector and configured to convert an electrical signal into a digital signal; and
   a processor, coupled to the collecting device and configured to process the digital signal, determine at least one physical attribute of the baggage based on the digital signal, and derive a third information on whether the baggage contains a hazardous material, based on the at least one physical attribute.

10. The baggage cart of claim 1, further comprising a detection device for cosmic rays, comprising:
    a detector, configured to receive the cosmic rays penetrating through the baggage;
    a collecting device, coupled to the detector and configured to convert an electrical signal from the detector into a digital signal; and
    a communication device configured to transmit the digital signal to a remote sever, and receive a fourth information on whether the baggage contains a hazardous material.

11. The baggage cart of claim 1, further comprising:
    a metal detector configured to detect that whether the baggage contains a metal and transmit a detection result to a processor, and the processer is configured to derive a fifth information on whether the baggage contains a metal.

12. The baggage cart of claim 1, further comprising:
    a trace detector configured to generate a sixth information on whether the baggage contains a hazardous material by trace detection.

13. The baggage cart of claim 7, wherein in response to at least one of the first information, the second information, the third information, the fourth information, the fifth information and the sixth information indicating an existence of the hazardous material, the controller is further configured to control the baggage cart to move to an alert zone.

14. The baggage cart of claim 1, wherein the cart body comprises a first compartment configured to contain a checked-in baggage and a second compartment configured to contain a carried-on baggage.

15. The baggage cart of claim 1, further comprising;
    a hydraulic strut bar coupled to the cart body and configured to elevate the baggage under a control of the controller.

16. The baggage cart of claim 1, further comprising a push rod coupled to the cart body and configured to push the baggage off the compartment under a control of the controller.

17. The baggage cart of claim 1, further comprising:
    a locating unit configured to generate a following signal when the user moves, so as to enable the baggage cart to follow the movement of the user or move according to guide marks disposed in surrounding environment of the baggage cart.

* * * * *